(12) United States Patent
Xu et al.

(10) Patent No.: US 11,576,075 B2
(45) Date of Patent: Feb. 7, 2023

(54) INFORMATION TRANSMISSION METHOD AND APPARATUS AND COMPUTER STORAGE MEDIUM

(71) Applicant: ZTE CORPORATION, Guangdong (CN)

(72) Inventors: Hui Xu, Shenzhen (CN); Chen Lu, Shenzhen (CN); Fang Xie, Shenzhen (CN); Yaying Wang, Shenzhen (CN); Jianfeng Ding, Shenzhen (CN); Xiaoquan Hua, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 330 days.

(21) Appl. No.: 16/497,413

(22) PCT Filed: Nov. 13, 2017

(86) PCT No.: PCT/CN2017/110750
§ 371 (c)(1),
(2) Date: Sep. 24, 2019

(87) PCT Pub. No.: WO2018/171222
PCT Pub. Date: Sep. 27, 2018

(65) Prior Publication Data
US 2020/0045579 A1     Feb. 6, 2020

(30) Foreign Application Priority Data
Mar. 24, 2017  (CN) .......................... 201710182684.5

(51) Int. Cl.
*H04W 28/04* (2009.01)
*H04W 28/02* (2009.01)
(52) U.S. Cl.
CPC ....... *H04W 28/04* (2013.01); *H04W 28/0236* (2013.01)

(58) Field of Classification Search
CPC ... H04L 1/0003; H04L 1/0009; H04L 1/0015; H04L 1/0025; H04L 1/0026;
(Continued)

(56) References Cited

U.S. PATENT DOCUMENTS

| 10,187,180 B2 * | 1/2019 | Sorrentino ............ H04L 1/0031 |
| 2006/0168343 A1 * | 7/2006 | Ma ........................ H04W 52/38 |
| | | 709/224 |

(Continued)

FOREIGN PATENT DOCUMENTS

| CN | 101018387 A | 8/2007 |
| CN | 101132227   | 2/2008 |

(Continued)

OTHER PUBLICATIONS

Office Action received in Chinese Patent Application No. 201710182684.5, dated Aug. 23, 2021 in 14 pages.

(Continued)

*Primary Examiner* — Saad A. Waqas
(74) *Attorney, Agent, or Firm* — Knobbe, Martens, Olson & Bear, LLP

(57) ABSTRACT

Provided are an information transmission method and apparatus, and computer storage medium. The method includes following steps: a base station or a second user equipment (UE) sends instruction information to a first UE, where the instruction information is used for instructing the first UE to report at least one of acknowledgement information or channel quality information through a first interface or a second interface; if the base station or the second UE receives the acknowledgement information sent by the first UE, the base station or the second UE determines whether to retransmit data through the first interface according to the acknowledgement information; if the base station or the second UE receives the channel quality information sent by (Continued)

the first UE, the base station or the second UE determines a wireless transmission parameter of the first interface according to the channel quality information.

16 Claims, 7 Drawing Sheets

(58) Field of Classification Search
CPC ... H04L 1/0027; H04L 5/0055; H04L 5/0057; H04W 28/0236; H04W 28/04
See application file for complete search history.

(56) References Cited

U.S. PATENT DOCUMENTS

| | | | |
|---|---|---|---|
| 2010/0035644 A1 | 2/2010 | Wu et al. | |
| 2010/0103891 A1 | 4/2010 | Okubo | |
| 2014/0177540 A1* | 6/2014 | Novak | H04W 72/042 370/329 |
| 2017/0202042 A1* | 7/2017 | Gao | H04W 76/14 |
| 2017/0264395 A1* | 9/2017 | Wakabayashi | H04W 76/14 |
| 2017/0310427 A1* | 10/2017 | Wakabayashi | H04L 1/1887 |
| 2017/0353273 A1* | 12/2017 | Zhang | H04L 1/1671 |
| 2017/0353950 A1* | 12/2017 | Song | H04W 72/1289 |
| 2018/0110041 A1* | 4/2018 | Bendlin | H04B 1/7143 |
| 2018/0234973 A1* | 8/2018 | Lee | H04W 88/04 |

FOREIGN PATENT DOCUMENTS

| | | | | |
|---|---|---|---|---|
| CN | 101388755 A | 3/2009 | | |
| CN | 101615979 A | 12/2009 | | |
| CN | 103384193 A | 11/2013 | | |
| CN | 103475455 | 12/2013 | | |
| CN | 104380627 A | 2/2015 | | |
| CN | 105917733 A | 8/2016 | | |
| CN | 106341839 A | 1/2017 | | |
| CN | 106507489 A | 3/2017 | | |
| CN | 105917733 B * | 1/2020 | ............ | H04W 76/10 |
| WO | WO 2016/082159 A1 | 6/2016 | | |
| WO | WO-2016082159 A1 * | 6/2016 | ............... | H04L 1/18 |

OTHER PUBLICATIONS

International Search Report received in Chinese Application No. 2017101826845., dated Aug. 13, 2021 in 6 pages.
Xu, Q, "Performance of PDSCH Channel and Harq for Broadband Wireless Trunking System" A master Thesis Submitted to University of Electronic Science and Technology of China.
International Search Report of Application No. PCT/CN2017/110750—5 pages (dated Jan. 29, 2018).
Supplemental Search Report for Chinese Application No. 2017101826845 dated Feb. 17, 2022.
The Second Office Action for Chinese Application No. 201710182684.5 dated Feb. 23, 2022.

* cited by examiner

INFORMATION TRANSMISSION METHOD AND APPARATUS AND COMPUTER STORAGE MEDIUM

CROSS-REFERENCE TO RELATED APPLICATIONS

This is a National Stage Application, filed under 35 U.S.C. 371, of International Patent Application No. PCT/CN2017/110750, filed on Nov. 13, 2017, which claims priority to Chinese patent application No. 201710182684.5 filed on Mar. 24, 2017, contents of both of which are incorporated herein by reference in their entireties.

TECHNICAL FIELD

The present disclosure relates to the field of information transmission technology and, in particular, relates to an information transmission method and apparatus, and computer storage medium.

BACKGROUND

With the rapid development of economic society, the vehicle parc is rapidly increased and road traffic accidents happen frequently. This has become one of the important factors affecting public safety in recent years. The road traffic safety has become one of the basic factors affecting the social harmony and improving the livelihood of people. At present, it is urgently required to improve traffic safety from several aspects such as technologies, policies and education. The design for improving vehicle safety is an important component.

The technology for improving the vehicle safety is mainly divided into a passive safety technology and an active safety technology. The passive safety technology is used for protecting people and objects inside and outside vehicles after an accident. The active safety technology is used for preventing and reducing vehicle accidents, and avoiding people from being injured. The active safety technology is the focus and trend of development of modern vehicle safety technology.

A collision warning system based on communication uses an advanced wireless communication technology and a new generation information processing technology to implement real-time information interaction between vehicles or between vehicles and roadside infrastructure, so that the current states (including positions, speeds, accelerations and driving paths of the vehicles) and the learned road environment information are notified to each other, and dangerous conditions of roads are sensed in a cooperative way. The collision warning system provides a variety of collision warning information in time, and prevents road traffic accidents. This provides a new thought to improve the road traffic safety in various countries at present.

Vehicle to Everything (V2X) technology may effectively manage and control vehicles, and provide comprehensive services to the vehicles. At present, there are two technologies for implementing the V2X, including: Dedicated Short Range Communication (DSRC) and Long Term Evolution (LTE). In an evolved V2X (eV2X) subject being studied by 3rd Generation Partnership Project (3GPP), the highest transmission reliability is required to reach 99.999%, and the minimum delay is required to be 3 ms. Thus, the reliability cannot be further improved simply through retransmission.

SUMMARY

The present disclosure provides an information transmission method and apparatus, and computer storage medium.

An embodiment of the present disclosure provides an information transmission method. The information transmission method includes steps described below.

A base station or a second user equipment (UE) sends instruction information to a first UE. The instruction information is used for instructing the first UE to report at least one of acknowledgement information or channel quality information through a first interface or a second interface. The first interface is an interface between the first UE and the second UE. The second interface is an interface between the first UE and the base station.

If the base station or the second UE receives the acknowledgement information sent by the first UE, the base station or the second UE determines whether to retransmit data through the first interface according to the acknowledgement information.

If the base station or the second UE receives the channel quality information sent by the first UE, the base station or the second UE determines a wireless transmission parameter of the first interface according to the channel quality information.

In an embodiment of the present disclosure, if the second UE is within coverage of the base station, the wireless transmission parameter of the first interface is determined according to instruction of the base station or through autonomous selection of the second UE;

if the second UE is outside the coverage of the base station, the wireless transmission parameter of the first interface is determined according to information pre-configured by the second UE.

In an embodiment of the present disclosure, the acknowledgement information includes one of positive acknowledgement information or negative acknowledgement information.

If the base station or the second UE receives the negative acknowledgement information sent by the first UE, data is determined to be retransmitted through the first interface.

In an embodiment of the present disclosure, the channel quality information is obtained by the first UE measuring a reference signal transmitted on a wireless channel in the first interface.

In an embodiment of the present disclosure, the wireless transmission parameter includes at least one of: maximum transmit power, a number of retransmission of a data block, a number of data resource blocks, a modulation and coding scheme (MCS) range or a limiting condition for channel occupancy.

In an embodiment of the present disclosure, the step in which the base station or the second UE determines the wireless transmission parameter according to the channel quality information includes steps described below.

The base station or the second UE compares the channel quality information with a preset threshold to obtain a comparison result.

Whether to adjust the wireless transmission parameter is determined according to the comparison result.

In an embodiment of the present disclosure, the information transmission method further includes steps described below.

If the base station or the second UE determines to adjust the wireless transmission parameter, the base station or the second UE sends the adjusted wireless transmission parameter to the first UE.

The second UE determines the adjusted wireless transmission parameter in one of following manners: instruction of the base station, autonomous selection or pre-configuration.

In an embodiment of the present disclosure, the information transmission method further includes steps described below.

The base station or the second UE determines a UE needing to report information as the first UE.

The base station or the second UE configures measurement information for the first UE, where the measurement information includes at least one of measurement target information, measurement configuration information, measurement threshold information or measurement report information.

An embodiment of the present disclosure provides an information transmission method. The information transmission method includes steps described below.

A first UE reports at least one of acknowledgement information or channel quality information through a first interface or a second interface according to instruction information. The first interface is an interface between the first UE and a second UE. The second interface is an interface between the first UE and a base station.

If the instruction information is used for instructing the first UE to report the acknowledgement information through the first interface or the second interface, the first UE determines the acknowledgement information according to a received data decoding result, and reports the acknowledgement information through the first interface or the second interface.

If the instruction information is used for instructing the first UE to report the channel quality information through the first interface or the second interface, the first UE measures a reference signal transmitted on a wireless channel in the first interface to obtain the channel quality information, and reports the channel quality information through the first interface or the second interface.

In an embodiment of the present disclosure, the acknowledgement information includes one of positive acknowledgement information or negative acknowledgement information.

If the first UE successfully decodes received data, the first UE reports the positive acknowledgement information through the first interface or the second interface.

If the first UE fails to decode the received data, the first UE reports the negative acknowledgement information through the first interface or the second interface.

In an embodiment of the present disclosure, the step in which the first UE reports the acknowledgement information through the first interface includes: the first UE reports the acknowledgement information to the second UE through the first interface.

The step in which the first UE reports the acknowledgement information through the second interface includes: the first UE reports the acknowledgement information to the base station through the second interface.

In an embodiment of the present disclosure, the step in which the first UE reports the channel quality information through the first interface includes: the first UE reports the channel quality information to the second UE through the first interface.

The step in which the first UE reports the channel quality information through the second interface includes: the first UE reports the channel quality information to the base station through the second interface.

In an embodiment of the present disclosure, the wireless transmission parameter includes at least one of: maximum transmit power, a number of retransmission of a data block, a number of data resource blocks, a MCS range or a limiting condition for channel occupancy.

In an embodiment of the present disclosure, if the first UE receives an adjusted wireless transmission parameter, the first UE receives data based on the adjusted wireless transmission parameter.

If the first UE fails to receive the adjusted wireless transmission parameter, the first UE receives data based on a current wireless transmission parameter or a local pre-configured wireless transmission parameter.

In an embodiment of the present disclosure, the information transmission method further includes steps described below.

The first UE receives measurement information sent by the base station, where the measurement information includes at least one of measurement target information, measurement configuration information, measurement threshold information or measurement report information.

The first UE measures, based on the measurement information, the reference signal transmitted on the wireless channel in the first interface, and reports the channel quality information based on the measurement information.

In an embodiment of the present disclosure, the first UE reports the acknowledgement information through a physical-layer signaling or a medium access control (MAC) signaling.

The first UE reports the channel quality information through a radio resource control (RRC) signaling.

In an embodiment of the present disclosure, the instruction information is sent to the first UE by the base station or the second UE, or the instruction information is information pre-configured by the first UE.

An embodiment of the present disclosure provides an information transmission apparatus, which is applied to a base station or a second UE. The information transmission apparatus includes an instruction unit, a retransmission unit and a determination unit.

The instruction unit is configured to send instruction information to a first UE. The instruction information is used for instructing the first UE to report at least one of acknowledgement information or channel quality information through a first interface or a second interface. The first interface is an interface between the first UE and the second UE. The second interface is an interface between the first UE and the base station.

The retransmission unit is configured to, if the acknowledgement information sent by the first UE is received, determine whether to retransmit data through the first interface according to the acknowledgement information.

The determination unit is configured to, if the channel quality information sent by the first UE is received, determine a wireless transmission parameter of the first interface according to the channel quality information.

In an embodiment of the present disclosure, the determination unit is further configured to, if the second UE is within coverage of the base station, determine the wireless transmission parameter of the first interface according to instruction of the base station or through autonomous selection of the second UE, and if the second UE is outside the coverage of the base station, determine the wireless transmission parameter of the first interface according to information pre-configured by the second UE.

In an embodiment of the present disclosure, the acknowledgement information includes one of positive acknowledgement information or negative acknowledgement information.

The retransmission unit is further configured to, if the negative acknowledgement information sent by the first UE is received, determine to retransmit data through the first interface.

In an embodiment of the present disclosure, the channel quality information is obtained by the first UE measuring a reference signal transmitted on a wireless channel in the first interface.

In an embodiment of the present disclosure, the wireless transmission parameter includes at least one of: maximum transmit power, a number of retransmission of a data block, a number of data resource blocks, a MCS range or a limiting condition for channel occupancy.

In an embodiment of the present disclosure, the determination unit is further configured to compare the channel quality information with a preset threshold to obtain a comparison result, and determine, according to the comparison result, whether to adjust the wireless transmission parameter.

In an embodiment of the present disclosure, the information transmission apparatus further includes a notification unit.

The notification unit is configured to, if determining to adjust the wireless transmission parameter, send the adjusted wireless transmission parameter to the first UE.

The second UE determines the adjusted wireless transmission parameter in one of following manners: instruction of the base station, autonomous selection or pre-configuration.

In an embodiment of the present disclosure, the determination unit is further configured to determine a UE needing to report information as the first UE.

The information transmission apparatus further includes a configuration unit. The configuration unit is configured to configure measurement information for the first UE, where the measurement information includes at least one of measurement target information, measurement configuration information, measurement threshold information or measurement report information.

Another embodiment of the present disclosure provides an information transmission apparatus, which is applied to a first UE. The information transmission apparatus includes an acquisition unit, a decoding unit, a first reporting unit, a measurement unit and a second reporting unit.

The acquisition unit is configured to acquire instruction information. The instruction information is used for instructing the first UE to report at least one of acknowledgement information or channel quality information through a first interface or a second interface. The first interface is an interface between the first UE and the second UE. The second interface is an interface between the first UE and the base station.

The decoding unit is configured to, if the instruction information is used for instructing the first UE to report the acknowledgement information through the first interface or the second interface, determine the acknowledgement information according to a received data decoding result.

The first reporting unit is configured to report the acknowledgement information through the first interface or the second interface.

The measurement unit is configured to, if the instruction information is used for instructing the first UE to report the channel quality information through the first interface or the second interface, measure a reference signal transmitted on a wireless channel in the first interface to obtain the channel quality information.

The second reporting unit is configured to report the channel quality information through the first interface or the second interface.

In an embodiment of the present disclosure, the acknowledgement information includes one of positive acknowledgement information or negative acknowledgement information.

If the decoding unit successfully decodes received data, the first reporting unit reports the positive acknowledgement information through the first interface or the second interface.

If the decoding unit fails to decode the received data, the first reporting unit reports the negative acknowledgement information through the first interface or the second interface.

In an embodiment of the present disclosure, the step in which the first reporting unit reports the acknowledgement information through the first interface includes: the first reporting unit reports the acknowledgement information to the second UE through the first interface.

The step in which the first reporting unit reports the acknowledgement information through the second interface includes: the first reporting unit reports the acknowledgement information to the base station through the second interface.

In an embodiment of the present disclosure, the step in which the second reporting unit reports the channel quality information through the first interface includes: the second reporting unit reports the channel quality information to the second UE through the first interface.

The step in which the second reporting unit reports the channel quality information through the second interface includes: the second reporting unit reports the channel quality information to the base station through the second interface.

In an embodiment of the present disclosure, the wireless transmission parameter includes at least one of: maximum transmit power, a number of retransmission of a data block, a number of data resource blocks, a MCS range or a limiting condition for channel occupancy.

In an embodiment of the present disclosure, if the first UE receives an adjusted wireless transmission parameter, the acquisition unit receives data based on the adjusted wireless transmission parameter;

if the first UE fails to receive the adjusted wireless transmission parameter, the acquisition unit receives data based on a current wireless transmission parameter or a local pre-configured wireless transmission parameter.

In an embodiment of the present disclosure, the acquisition unit is further configured to receive measurement information sent by the base station, where the measurement information includes at least one of measurement target information, measurement configuration information, measurement threshold information or measurement report information.

The measurement unit is further configured to measure the reference signal transmitted on the wireless channel in the first interface.

The second reporting unit is further configured to report the channel quality information.

In an embodiment of the present disclosure, the first reporting unit is further configured to report the acknowledgement information through a physical-layer signaling or a medium access control (MAC) signaling.

The second reporting unit is further configured to report the channel quality information through a radio resource control (RRC) signaling.

In the embodiment of the present disclosure, the instruction information is sent to the first UE by the base station or the second UE, or the instruction information is information pre-configured by the first UE.

An embodiment of the present disclosure provides a computer storage medium. Computer executable instructions are stored in the computer storage medium. The computer executable instructions are configured to execute the above information transmission method.

In the present disclosure, the first UE reports at least one of the acknowledgement information or the channel quality information through the first interface or the second interface according to the instruction information. The first interface is the interface between the first UE and the second UE. The second interface is the interface between the first UE and the base station. If the base station or the second UE receives the acknowledgement information sent by the first UE, the base station or the second UE determines whether to retransmit data through the first interface according to the acknowledgement information. If the base station or the second UE receives the channel quality information sent by the first UE, the base station or the second UE determines the wireless transmission parameter of the first interface according to the channel quality information. In the present disclosure, the first UE reports related information to the base station or the second UE according to the instruction information sent by the base station, and the base station or the second UE determines whether to retransmit data and/or adjust the wireless transmission parameter, so that acknowledgement of V2X data and feedback of channel quality are implemented, and the requirement of sending V2X services with high reliability is guaranteed.

BRIEF DESCRIPTION OF DRAWINGS

The drawings generally illustrate various embodiments discussed herein by way of example and not limitation.

DETAILED DESCRIPTION

Figure 1:
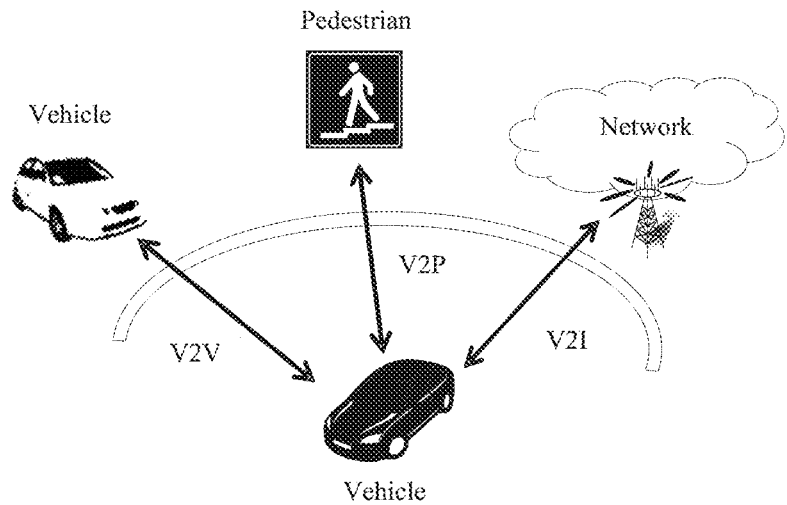
FIG. 1 is a schematic diagram of V2X.

In order to understand features and technical content of the embodiments of the present disclosure in more detail, the embodiments of the present disclosure will be further described in detail hereinafter in conjunction with the drawings. The accompanying drawings are only used for reference and illustration and not for limiting the embodiments of the present disclosure. FIG. 1 is a schematic diagram of V2X. For the V2X, vehicle information is provided by means of sensors, on-board terminals and electronic tags mounted on vehicles, various communication technologies are adopted to implement interconnection and intercommunication of Vehicle to Vehicle (V2V), Vehicle to Pedestrian (V2P) and Vehicle to Infrastructure (V2I), and effective utilization, such as extraction and sharing, of the information is implemented on an information network platform, so that vehicles are effectively managed and controlled, and are provided with comprehensive services.

The V2X has two implementation technologies: Dedicated Short Range Communication (DSRC) and Long Term Evolution (LTE). The DSRC is implemented based on Institute of Electrical and Electronics Engineers (IEEE) 802.11P and IEEE 1609 series standards. The IEEE 802.11P is responsible for the physical layer and Medium Access Control (MAC) technology, and the IEEE 1609 is responsible for upper-layer specifications. The V2X technology based on the LTE is being studied.

Figure 2:
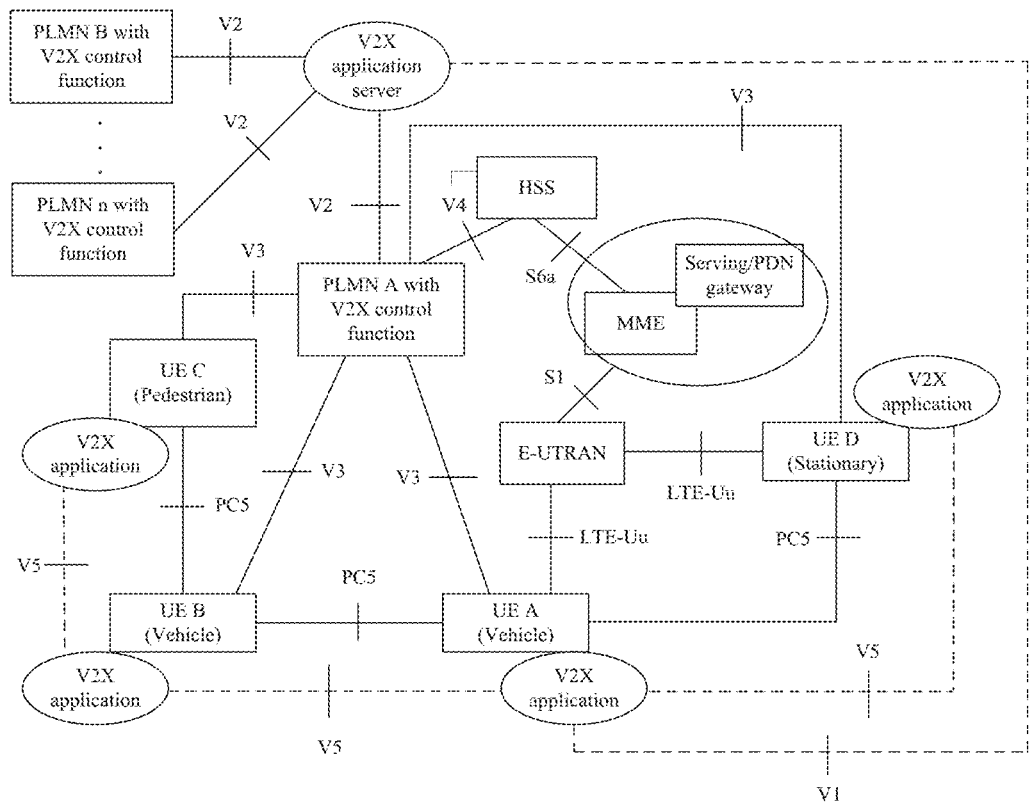
FIG. 2 is an architectural diagram of transmitting V2X services through a PC5 interface.

A Road Side Unit (RSU) may receive a request from a vehicle and ensure that the vehicle have access to the Internet, i.e., the RSU has a function of a gateway. In addition, the RSU also has functions of data operation, storage and forwarding. The V2X technology based on the LTE under discussion at 3rd Generation Partnership Project (3GPP) includes the followings: the RSU may be implemented through a stationary user equipment (UE) or an evolved NodeB (eNB); V2V/V2I/V2P may be implemented through a PC5 interface or a Uu interface. The PC5 interface refers to an air interface for Device-to-Device (D2D). The Uu interface refers to an air interface for UE-to-eNB. System architecture for sending V2X services through the PC5 interface is shown in FIG. 2.

In the V2X based on the LTE, the highest reliability is required to be 95%. The V2X based on the LTE adopts retransmission to improve reliability in the PC5 interface. There is no effective scheme to improve reliability in the Uu interface. In addition, in an evolved V2X (eV2X) subject being studied by the 3GPP, the highest transmission reliability is required to reach 99.999%, and the minimum delay is required to be 3 ms. At present, the reliability cannot be further improved simply through retransmission. This is because that, on the one hand, if a channel condition is better, retransmission may not be needed; on the other hand, if the channel condition is poor, a wireless transmission parameter may need to be adjusted in addition to the retransmission.

For convenience of description, in the embodiments of the present disclosure, V-UE refers to a Vehicle-UE, and P-UE refers to a Pedestrian-UE.

The embodiments of the present disclosure relate to two kinds of information transmission apparatus: a first kind of information transmission apparatus and a second kind of information transmission apparatus. The first kind of information transmission apparatus is configured at a terminal, and the second kind of information transmission apparatus is configured at a network element of an access network.

(1) The above terminal includes at least one of an On-Board Unit (OBU), the RSU, the UE, the V-UE, the P-UE, a wearable device, a UE-to-network relay, an Internet of Thing (IoT)/Machine Type Communication (MTC) terminal. Unless otherwise specified, the UE involved in the embodiments of the present disclosure represents at least one of the above terminals. The terminal sends acknowledgement information or channel quality information through a PC5 interface or a Uu interface. Other terminals, which have received the above information, retransmit V2X service data or adjust a wireless transmission parameter of the PC5 interface or a wireless transmission parameter of the Uu interface.

(2) The above network element of the access network is a base station. The base station includes at least one of the eNB, or a gNB of the 5th generation (5G) mobile network. The network element of the access network is mainly responsible for instructing the terminal to report the acknowledgement information or the channel quality information through the PC5 interface or the Uu interface, and instructing the terminal to adjust the wireless resource parameter of the PC5 interface or the wireless resource parameter of the Uu interface.

Figure 3:
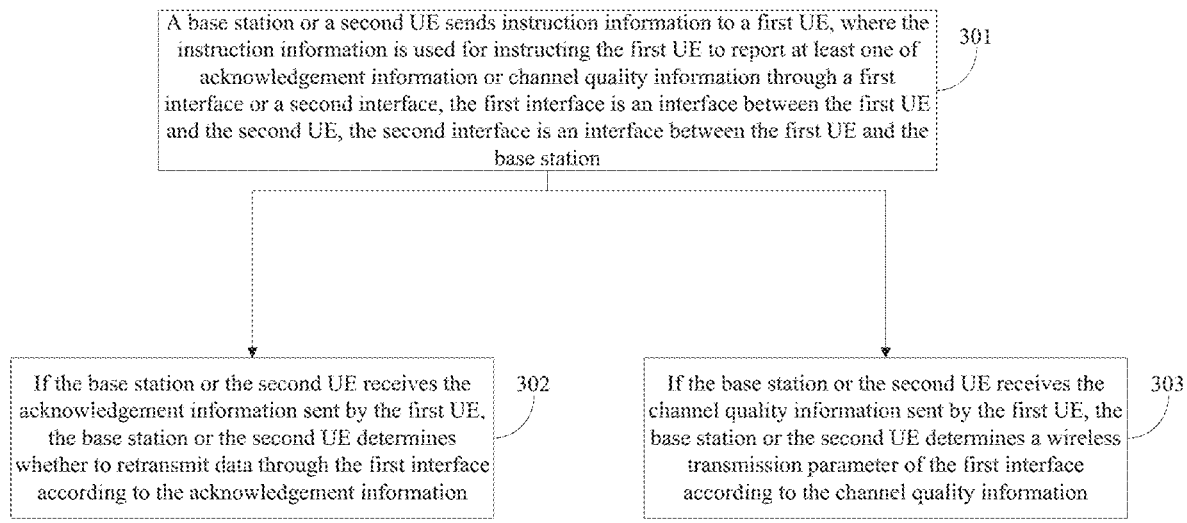
FIG. 3 is a flowchart 1 of an information transmission method in an embodiment of the present disclosure.

FIG. 3 is a flowchart 1 of an information transmission method in an embodiment of the present disclosure. In this embodiment, the information transmission method is applied to a base station. As shown in FIG. 3, the information transmission method includes steps described below.

In step 301, a base station or a second UE sends instruction information to a first UE. The instruction information is used for instructing the first UE to report at least one of acknowledgement information or channel quality information through a first interface or a second interface. The first interface is an interface between the first UE and the second UE. The second interface is an interface between the first UE and the base station.

Here, the first UE refers to a receiver of V2X service data. Correspondingly, in the embodiment of the present disclosure, the second UE represents a sender of the V2X service data. Of course, the sender of the V2X service data may also be the base station.

In the embodiment of the present disclosure, the base station sends the instruction information to the first UE through a system message or a radio resource control (RRC) signaling. The RRC signaling refers in particular to a RRC dedicated signaling such as RRC_connection_reconfiguration.

In an embodiment of the present disclosure, the first interface is an interface between a UE and a UE, such as the PC5 interface; the second interface is an interface between the first UE and the base station, such as the Uu interface.

In an embodiment of the present disclosure, the acknowledgement information includes one of positive acknowledgement information or negative acknowledgement information.

In step 302, if the base station or the second UE receives the acknowledgement information sent by the first UE, the base station or the second UE determines whether to retransmit data through the first interface according to the acknowledgement information.

In an embodiment of the present disclosure, if the base station or the second UE receives the negative acknowledgement information sent by the first UE, the base station or the second UE determines to retransmit data through the first interface.

In step 303, if the base station or the second UE receives the channel quality information sent by the first UE, the base station or the second UE determines a wireless transmission parameter of the first interface according to the channel quality information.

In an embodiment of the present disclosure, if the second UE is within coverage of the base station, the wireless transmission parameter of the first interface is determined according to instruction of the base station or through autonomous selection of the second UE;

if the second UE is outside the coverage of the base station, the wireless transmission parameter of the first interface is determined according to information pre-configured by the second UE.

In an embodiment of the present disclosure, the channel quality information is obtained by the first UE measuring a reference signal transmitted on a wireless channel in the first interface.

In an embodiment of the present disclosure, the wireless transmission parameter includes at least one of: maximum transmit power, a number of retransmission of a data block, a number of data resource blocks, a modulation and coding scheme (MCS) range or a limiting condition for channel occupancy.

In an embodiment of the present disclosure, the step in which the base station or the second UE determines the wireless transmission parameter according to the channel quality information includes steps described below.

The base station or the second UE compares the channel quality information with a preset threshold to obtain a comparison result.

Whether to adjust the wireless transmission parameter is determined according to the comparison result.

In an embodiment of the present disclosure, the information transmission method further includes steps described below.

If the base station or the second UE determines to adjust the wireless transmission parameter, the base station or the second UE sends the adjusted wireless transmission parameter to the first UE.

The second UE sends the adjusted wireless transmission parameter in one of following manners: instruction of the base station, autonomous selection or pre-configuration.

In an embodiment of the present disclosure, the information transmission method further includes steps described below.

The base station or the second UE determines a UE needing to report information as the first UE.

The base station or the second UE configures measurement information for the first UE. The measurement information includes at least one of measurement target information, measurement configuration information, measurement threshold information or measurement report information.

Figure 4:
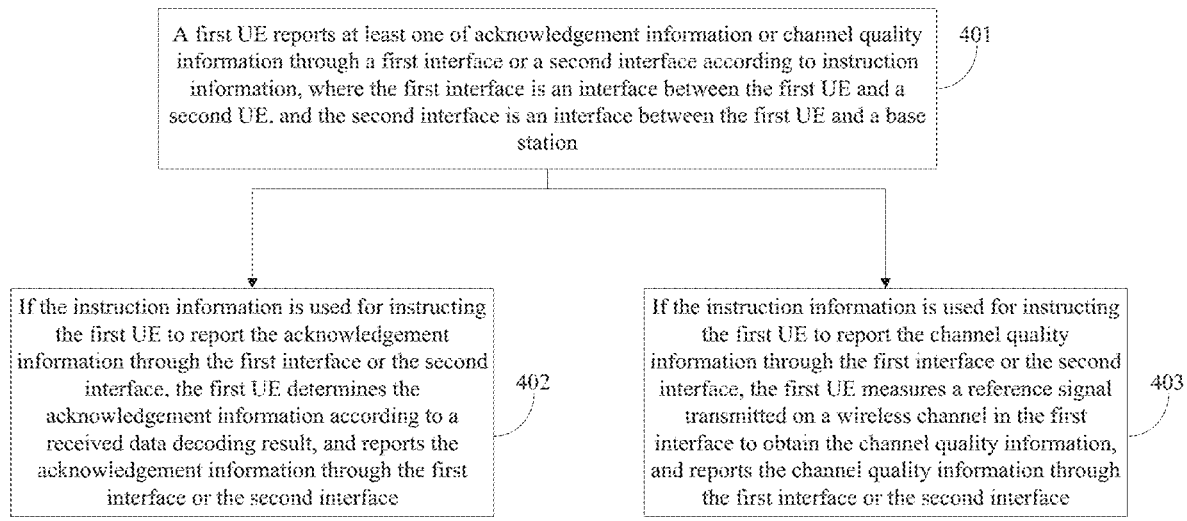
FIG. 4 is a flowchart 2 of an information transmission method in an embodiment of the present disclosure.

It should be noted that the execution order between the step 302 and the step 303 is not limited. FIG. 4 is a flowchart 2 of an information transmission method in an embodiment of the present disclosure. In this embodiment, the information transmission method is applied to a first UE. As shown in FIG. 4, the information transmission method includes steps described below.

In step 401, a first UE reports at least one of acknowledgement information or channel quality information through a first interface or a second interface according to instruction information. The first interface is an interface between the first UE and a second UE. The second interface is an interface between the first UE and a base station.

In step 402, if the instruction information is used for instructing the first UE to report the acknowledgement information through the first interface or the second interface, the first UE determines the acknowledgement information according to a received data decoding result, and reports the acknowledgement information through the first interface or the second interface.

In an embodiment of the present disclosure, the acknowledgement information includes one of positive acknowledgement information or negative acknowledgement information.

If the first UE successfully decodes received data, the first UE reports the positive acknowledgement information through the first interface or the second interface.

If the first UE fails to decode the received data, the first UE reports the negative acknowledgement information through the first interface or the second interface.

In an embodiment of the present disclosure, the step in which the first UE reports the acknowledgement information through the first interface includes: the first UE reports the acknowledgement information to the second UE through the first interface;

the step in which the first UE reports the acknowledgement information through the second interface includes: the first UE reports the acknowledgement information to the base station through the second interface.

In an embodiment of the present disclosure, the first UE reports the acknowledgement information through a physical-layer signaling or a medium access control (MAC) signaling.

In step 403, if the instruction information is used for instructing the first UE to report the channel quality information through the first interface or the second interface, the first UE measures a reference signal transmitted on a wireless channel in the first interface to obtain the channel quality information, and reports the channel quality information through the first interface or the second interface.

In an embodiment of the present disclosure, the step in which the first UE reports the channel quality information through the first interface includes: the first UE reports the channel quality information to the second UE through the first interface;

the step in which the first UE reports the channel quality information through the second interface includes: the first UE reports the channel quality information to the base station through the second interface.

In an embodiment of the present disclosure, the wireless transmission parameter includes at least one of: maximum transmit power, a number of retransmission of a data block, a number of data resource blocks, a modulation and coding scheme (MCS) range or a limiting condition for channel occupancy.

In an embodiment of the present disclosure, if the first UE receives an adjusted wireless transmission parameter, the first UE receives data based on the adjusted wireless transmission parameter;

if the first UE fails to receive the adjusted wireless transmission parameter, the first UE receives data based on a current wireless transmission parameter or a local pre-configured wireless transmission parameter.

In an embodiment of the present disclosure, the information transmission method further includes steps described below.

The first UE receives at least one of measurement target information, measurement configuration information, measurement threshold information or measurement report information send by the base station.

The first UE measures the reference signal transmitted on the wireless channel in the first interface, and reports the channel quality information.

In an embodiment of the present disclosure, the first UE reports the channel quality information through a radio resource control (RRC) signaling.

It should be noted that the execution order between the step 402 and the step 403 is not limited.

The present disclosure will be further described in detail hereinafter in conjunction with specific application scenarios.

Figure 5:
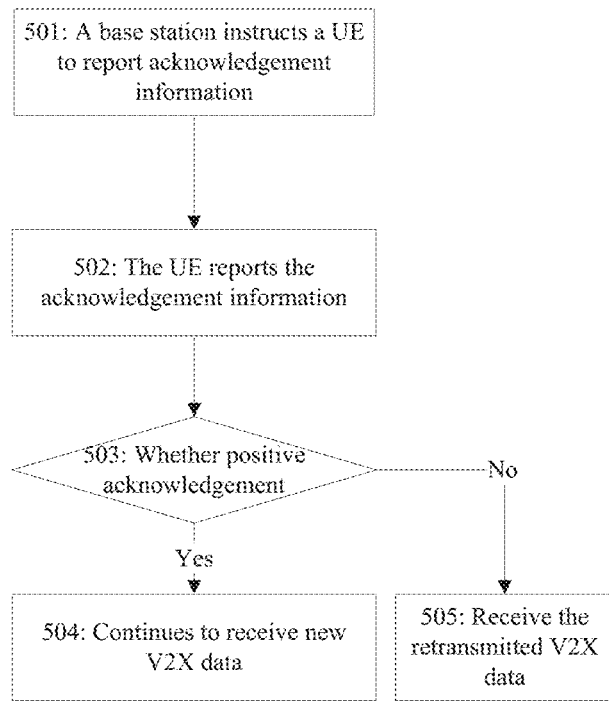
FIG. 5 is a flowchart 3 of an information transmission method in an embodiment of the present disclosure.

Embodiment 1 (UE reports acknowledgement information):

An embodiment of the present disclosure provides an information transmission method. As shown in FIG. 5, the information transmission method of the embodiment includes steps described below.

In step 501, a base station instructs a UE to report acknowledgement information.

The base station selects the UE needing to report information, and sends instruction information to the UE. The instruction information is sent through a system message or a radio resource control (RRC) dedicated signaling (such as RRC_Connection_Reconfiguration). The UE receives V2X data through a Uu interface or a PC5 interface.

In step 502, the UE reports the acknowledgement information.

The UE receives the V2X data. If the UE correctly decodes the V2X data, a "positive" acknowledgement is reported; otherwise, a "negative" acknowledgement is reported. The UE reports the acknowledgement information through one of the Uu interface or the PC5 interface. In step 503, whether acknowledgement is the positive acknowledgement is determined. If yes, jump to step 504; if not, jump to step 505.

The determination is executed by a UE or the base station. When the acknowledgement is received through the Uu interface, the determination is implemented by the base station; when the acknowledgement is received through the PC5 interface, the determination is implemented by the UE. The UE here is a sending UE that sends the V2X data through the PC5 interface, rather than the UE that reports the acknowledgement information.

If the acknowledgement is the "positive" acknowledgement, it is indicated that the receiving UE is capable of correctly decoding the received V2X data.

If the acknowledgement is the "negative" acknowledgement, it is indicated that the receiving UE is incapable of correctly decoding the received V2X data, that is, errors occurred during transmission, such as deterioration of a channel condition.

In step 504, new V2X data continues to be received.

If the positive acknowledgement is received, the base station or the sending UE continues to send the new V2X data, and the receiving UE continues to receive the new V2X data.

In step 505, the retransmitted V2X data is received.

If the negative acknowledgement is received, the base station retransmits the V2X data through the Uu interface, or the sending UE retransmits the V2X data through the PC5 interface.

Figure 6:
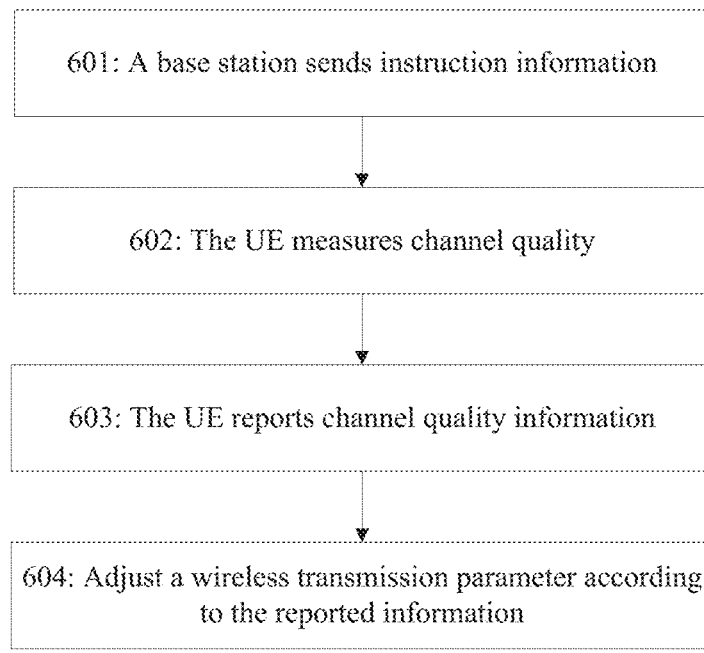
FIG. 6 is a flowchart 4 of an information transmission method in an embodiment of the present disclosure.

Embodiment 2 (UE reports channel quality information):

An embodiment of the present disclosure provides an information transmission method. As shown in FIG. 6, the information transmission method provided by the embodiment includes steps described below.

In step 601, a base station sends instruction information.

Specifically, the base station selects a UE needing to measure and report, and sends the instruction information to the UE. The instruction information is sent through a system message or a RRC dedicated signaling (such as RRC_Connection_Reconfiguration).

In step 602, the UE measures channel quality.

The channel includes one of a Uu UpLink (UL), a PC5 Control Channel or a service channel.

The channel quality is acquired through measuring a reference signal carried on the channel.

The UE measures the channel quality according to the instruction information from the base station.

In step 603, the UE reports channel quality information.

The UE reports the channel quality information according to the instruction information from the base station. The type of reporting includes periodic reporting or event-triggered reporting. The channel quality information is used for characterizing channel quality, and is generally indicated by an index value. The above index value corresponds to a specific wireless parameter set such as a transport block size, a Modulation and Coding Scheme (MCS) and a Transmission Time Interval (TTI). The UE reports the channel quality information through a Uu interface or a PC5 interface.

The UE reports the channel quality information in one of following manners: a RRC signaling, a physical signaling or a Medium Access Control (MAC) layer signaling.

In step 604, a wireless transmission parameter is adjusted according to the reported information.

The step 604 is executed by the base station or a sending UE. The base station or the sending UE refers to the base station or the sending UE that receives the channel quality information. The wireless transmission parameter may remain unchanged according to a preset rule or threshold. If the base station adjusts the wireless transmission parameter, the base station will notify the UE of the adjusted parameter. The adjustment may be made for at least one wireless transmission parameter.

Figure 7:
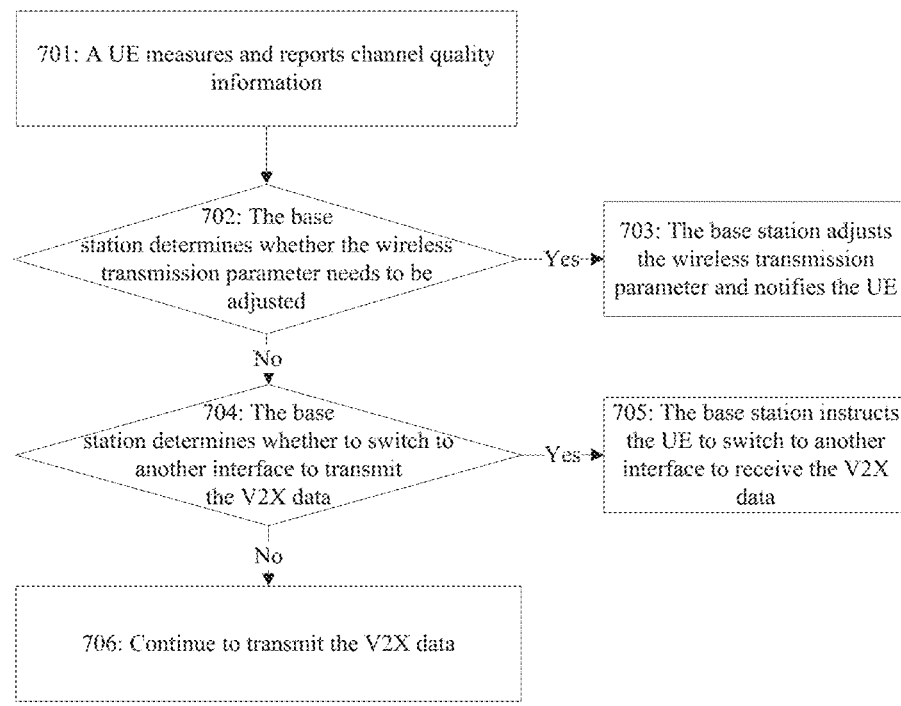
FIG. 7 is a flowchart 5 of an information transmission method in an embodiment of the present disclosure.

Embodiment 3 (a base station adjusts a wireless transmission parameter):

An embodiment of the present disclosure provides an information transmission method. As shown in FIG. 7, the information transmission method provided by the embodiment includes steps described below.

In step 701, a UE measures and reports channel quality information.

The UE measures and reports the channel quality information according to configuration information of the base station. The measurement is for a Uu interface or a PC5 interface. The UE reports the channel quality information through the Uu interface. That is, the channel quality information is reported to the base station, and the content to be reported includes the channel quality of the Uu interface or the channel quality of the PC5 interface.

In step 702, the base station determines whether the wireless transmission parameter needs to be adjusted. If yes, jump to step 703; if not, jump to step 704.

The base station determines whether to adjust the wireless transmission parameter according to the received channel quality information. For example, if the received channel quality information indicates that a channel condition is better, the base station may determine, according to a preset condition, to reduce transmit power and the number of retransmission of a data block, to increase a data resource block size, to improve a modulation and coding scheme (MCS) and the like.

In step 703, the base station adjusts the wireless transmission parameter and notifies the UE.

The adjustment is made for the Uu interface or the PC5 interface. The base station notifies the UE through a RRC dedicated signaling or a system message. The UE is the affected UE, such as a receiving UE that receives V2X data transmitted through the Uu interface, or the UE that receives and sends the V2X data transmitted through the PC5 interface.

In step 704, the base station determines whether to switch to another interface to transmit the V2X data. If yes, jump to step 705; if not, jump to step 706.

If the base station determines that channel quality of the current interface is poor, the channel is congested, or the V2X data cannot be transmitted through adjustment of the wireless transmission parameter, the base station may switch to another interface to transmit the V2X data. For example, if the current interface is the Uu interface, the base station switches to the PC5 interface; if the current interface is the PC5 interface, the base station switches to the Uu interface.

The base station determines whether to switch to another interface according to following conditions: quality of the current interface, quality of the switched interface, operator policies, V2X service demands, etc.

In step 705, the base station instructs the UE to switch to another interface to receive the V2X data.

The base station determines to switch to another interface, and sends an instruction to the UE.

The instruction includes a new interface and a wireless transmission parameter of the new interface. The another interface includes the Uu interface or the PC5 interface. The UE may acquire the wireless transmission parameter of the new interface before switching.

In step 706, the V2X data continues to be transmitted.

If the wireless transmission parameter does not need to be adjusted or the interface does not needed to be switched, the V2X data continues to be transmitted through the current interface.

Figure 8:
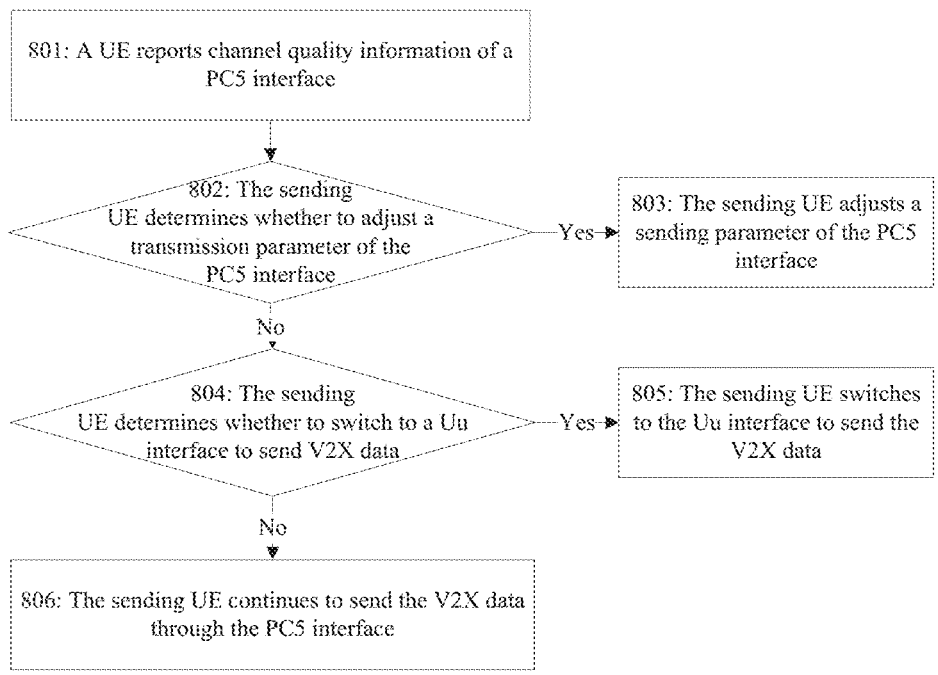
FIG. 8 is a flowchart 6 of an information transmission method in an embodiment of the present disclosure.

Embodiment 4 (UE adjusts a transmission parameter of a PC5 interface):

An embodiment of the present disclosure provides an information transmission method. As shown in FIG. 8, the information transmission method provided by the embodiment includes steps described below.

In step 801, a UE reports channel quality information of a PC5 interface.

The UE measures channel quality of the PC5 interface according to configuration information of the base station, and reports the channel quality information to a sending UE through the PC5 interface.

In step 802, the sending UE determines whether to adjust a transmission parameter of the PC5 interface. If yes, jump to step 803; if not, jump to step 804.

The sending UE determines whether to adjust the transmission parameter of the PC5 interface according to the received channel quality information.

In step 803, the sending UE adjusts a sending parameter of the PC5 interface.

The sending UE adjusts the sending parameter of the PC5 interface according to the configuration information of the base station.

In step 804, the sending UE determines whether to switch to a Uu interface to send V2X data. If yes, jump to step 805; if not, jump to step 806.

The sending UE determines whether to switch to the Uu interface according to following information: instruction of the base station, channel quality of the PC5 interface, channel quality of the Uu interface, operator policies and V2X service demands. For example, if the PC5 interface has poor channel quality, the Uu interface has good channel quality, and the operator policies allow switching, the base station instructs the sending UE to switch from the PC5 interface to the Uu interface. If the Uu interface meets the V2X service demands, the sending UE may switch from the PC5 interface to the Uu interface. A wireless transmission parameter of the Uu interface is configured by the base station, and the sending UE may acquire the wireless transmission parameter of the Uu interface before switching.

In step 805, the sending UE switches to the Uu interface to send the V2X data.

The sending UE switches to the Uu interface to send the V2X data to the base station. The V2X data is sent to a target UE through broadcast bearer or unicast bearer over an operator network.

In step 806, the sending UE continues to send the V2X data through the PC5 interface.

If the sending UE does not need to adjust a transmission parameter of the PC5 interface and does not need to switch to the Uu interface, the sending UE continues to send the V2X data through the PC5 interface.

Figure 9:
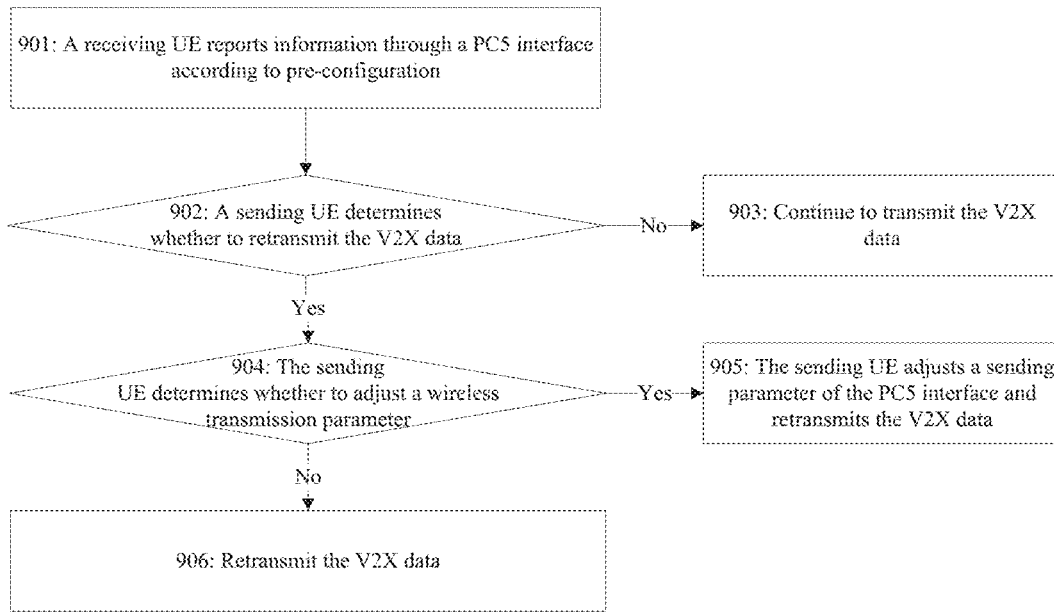
FIG. 9 is a flowchart 7 of an information transmission method in an embodiment of the present disclosure.

Embodiment 5 (UE is outside coverage of a base station):

An embodiment of the present disclosure provides an information transmission method in condition that a UE is outside coverage of a base station. As shown in FIG. 9, the information transmission method provided by the embodiment includes steps described below.

In step 901, a receiving UE reports information through a PC5 interface according to pre-configuration.

The receiving UE determines that the receiving UE is outside coverage of the base station. If the receiving UE fails to receive a valid system message, a valid synchronization signal or a valid reference signal, it may be determined that the receiving UE is outside the coverage of the base station. The receiving UE reports the information according to configuration information pre-stored in the local, i.e., in a UE memory or a universal integrated circuit card (UICC). The information includes acknowledgement information and channel quality information. The acknowledgement information is used for instructing whether to retransmit V2X data. For example, if the acknowledgement information is positive acknowledgement information, the V2X data does not need to be retransmitted; if the acknowledgement information is negative acknowledgement information, the V2X data needs to be retransmitted.

In step 902, a sending UE determines whether to retransmit the V2X data. If yes, jump to step 904; if not, jump to step 903.

The sending UE receives the reported information. If the acknowledgement information is "positive", the sending UE determines to retransmit the V2X data; if the acknowledgement information is not "positive", the sending UE determines not to retransmit the V2X data.

In step 903, the V2X data continues to be transmitted.

If the sending UE does not need to retransmit the V2X data, the sending UE continues to send new V2X data.

It should be noted that even though the sending UE does not need to retransmit the V2X data, the sending UE may adjust a wireless parameter according to channel quality and transmit new V2X data by adopting the new parameter (which is pre-configured).

In step 904, the sending UE determines whether to adjust a wireless transmission parameter. If yes, jump to step 905, if not, jump to step 906.

The sending UE needs to retransmit the V2X data. The sending UE determines whether to adjust the wireless transmission parameter according to the received channel quality information. A rule for the determination is pre-configured. For example, when the channel quality reaches a pre-configured threshold, the wireless transmission parameter is adjusted.

In step 905, the sending UE adjusts a sending parameter of the PC5 interface, and retransmits the V2X data.

The sending parameter is pre-configured, that is, pre-stored in the sending UE.

In step 906, the V2X data is retransmitted.

The sending UE retransmits the V2X data by adopting an original wireless transmission parameter.

Figure 10:
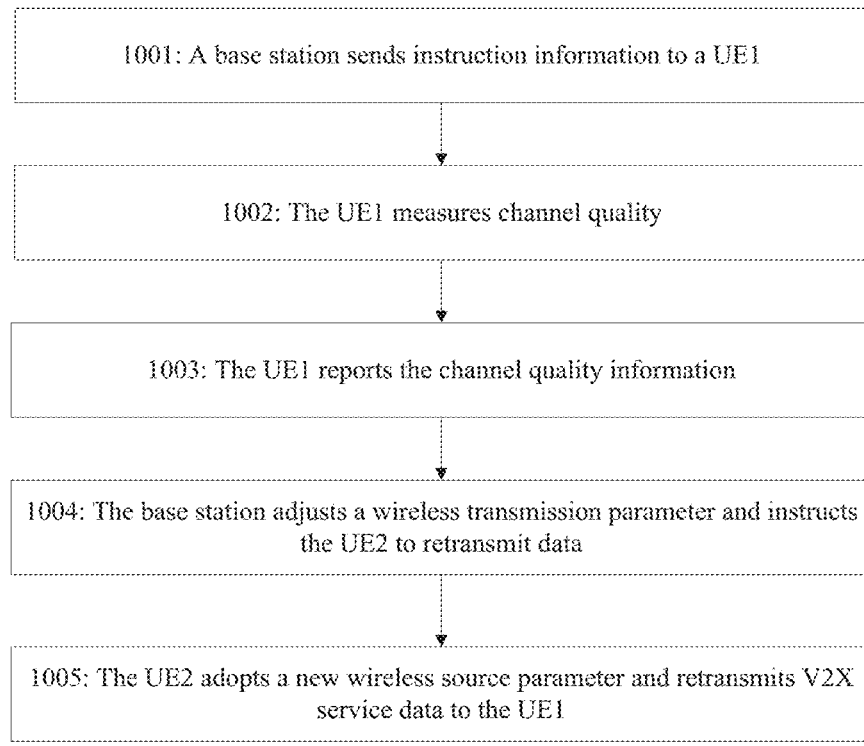
FIG. 10 is a flowchart 8 of an information transmission method in an embodiment of the present disclosure.

Embodiment 6 (UE2 retransmits data):

An embodiment of the present disclosure provides an information transmission method. As shown in FIG. 10, the information transmission method provided by the embodiment includes steps described below.

In step 1001, a base station sends instruction information to a UE1.

Specifically, the base station selects the UE1 needing to measure and report, and sends m instruction information to the UE1 for measurement. The instruction information is sent through a system message or a RRC dedicated signaling (such as RRC_Connection_Reconfiguration).

In step 1002, the UE1 measures channel quality.

The channel includes one of a Uu UL, a PC5 control channel or a service channel. The channel quality is acquired by measuring a reference signal carried on a channel. The UE1 measures the channel quality according to the instruction information from the base station.

In step 1003, the UE1 reports the channel quality information.

The UE1 reports the channel quality information according to the instruction information from the base station. The type of reporting includes periodic reporting or event-triggered reporting. The channel quality information is used for characterizing the channel quality, and is generally indicated by an index value. The index value corresponds to a specific wireless parameter set.

In step 1004, the base station adjusts a wireless transmission parameter and instructs the UE2 to retransmit data.

In step 1005, the UE2 adopts a new wireless source parameter and retransmits V2X service data to the UE1.

Figure 11:
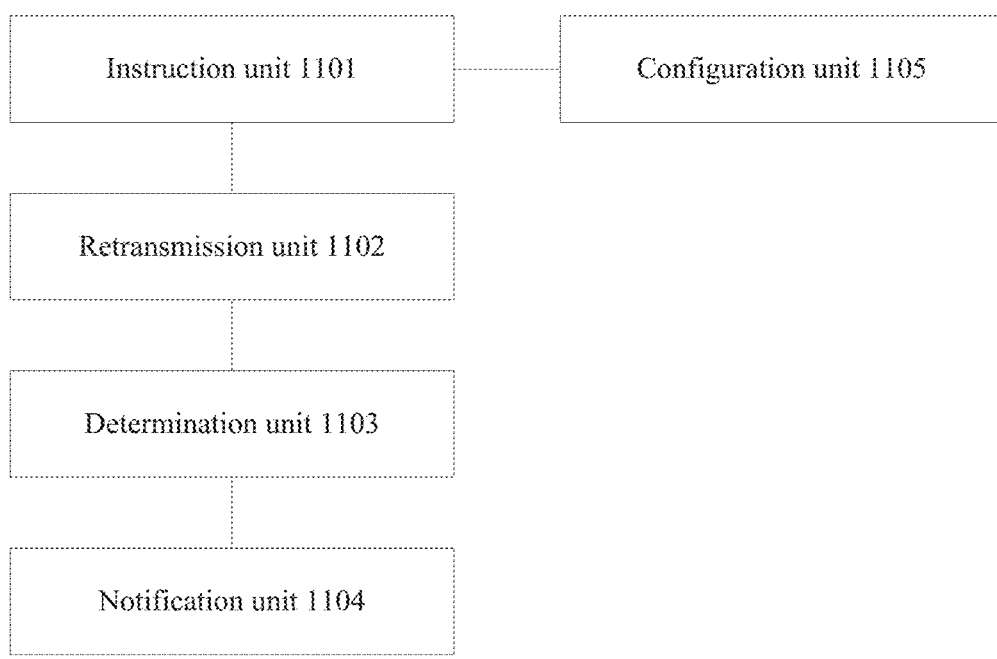
FIG. 11 is a schematic diagram 1 of structure composition of an information transmission apparatus in an embodiment of the present disclosure.

FIG. 11 is a schematic diagram 1 of structure composition of an information transmission apparatus in an embodiment of the present disclosure. The information transmission apparatus is applied to a base station or a second UE. As shown in FIG. 11, the information transmission apparatus includes an instruction unit 1101, a retransmission unit 1102 and a determination unit 1103.

The instruction unit 1101 is configured to send instruction information to a first UE. The instruction information is used for instructing the first UE to report at least one of acknowledgement information or channel quality information through a first interface or a second interface. The first interface is an interface between the first UE and the second UE. The second interface is an interface between the first UE and the base station.

The retransmission unit 1102 is configured to, if the acknowledgement information sent by the first UE is received, determine whether to retransmit data through the first interface according to the acknowledgement information.

The determination unit 1103 is configured to, if the channel quality information sent by the first UE is received, determine a wireless transmission parameter of the first interface according to the channel quality information.

In an embodiment of the present disclosure, the determination unit 1103 is further configured to: if the second UE is within coverage of the base station, determine the wireless transmission parameter of the first interface according to instruction of the base station or through autonomous selection of the second UE; and if the second UE is outside the coverage of the base station, determine the wireless transmission parameter of the first interface according to information pre-configured by the second UE.

In an embodiment of the present disclosure, the acknowledgement information includes one of positive acknowledgement information or negative acknowledgement information.

The retransmission unit 1102 is further configured to, if the negative acknowledgement information sent by the first UE is received, determine to retransmit data through the first interface.

In an embodiment of the present disclosure, the channel quality information is obtained by the first UE measuring a reference signal transmitted on a wireless channel in the first interface.

In an embodiment of the present disclosure, the wireless transmission parameter includes at least one of: maximum transmit power, a number of retransmission of a data block, a number of data resource blocks, a modulation and coding scheme (MCS) range or a limiting condition for channel occupancy.

In an embodiment of the present disclosure, the determination unit 1103 is further configured to compare the channel quality information with a preset threshold to obtain a comparison result, and determine, according to the comparison result, whether to adjust the wireless transmission parameter.

In an embodiment of the present disclosure, the information transmission apparatus further includes a notification unit 1104.

The notification unit 1104 is configured to, if determining to adjust the wireless transmission parameter, send the adjusted wireless transmission parameter to the first UE.

The second UE determines the adjusted wireless transmission parameter in one of following manners: instruction of the base station, autonomous selection or pre-configuration.

In an embodiment of the present disclosure, the determination unit 1103 is further configured to determine a UE needing to report information as the first UE.

The information transmission apparatus further includes a configuration unit 1105. The configuration unit 1105 is configured to configure measurement information for the first UE. The measurement information includes at least one of measurement target information, measurement configuration information, measurement threshold information or measurement report information.

Those skilled in the art should understand that the functions implemented by the units in the information transmission apparatus shown in FIG. 11 may be understood with reference to the related description of the above-mentioned information transmission method.

In practical applications, the functions implemented by the units in the information transmission apparatus may be implemented by a Central Processing Unit (CPU), a Micro Processor Unit (MPU), a Digital Signal Processor (DSP) or a Field Programmable Gate Array (FPGA) in the information transmission apparatus.

Accordingly, an embodiment of the present disclosure further provides a base station or a second UE. The base station includes a memory and processor. Computer executable instructions are stored in the memory. When calling and executing the computer executable instructions in the memory, the processor may implement the information transmission method in the embodiment of the present disclosure. The information transmission method includes following steps: instruction information is sent to a first UE, where the instruction information is used for instructing the first UE to report at least one of acknowledgement information or channel quality information through a first interface or a second interface, the first interface is an interface between the first UE and the second UE, and the second interface is an interface between the first UE and the base station; if receiving the acknowledgement information sent by the first UE, the base station or the second UE determines whether to retransmit data through the first interface according to the acknowledgement information; if receiving the channel quality information sent by the first UE, the base station or the second UE determines a wireless transmission parameter of the first interface according to the channel quality information.

Figure 12:
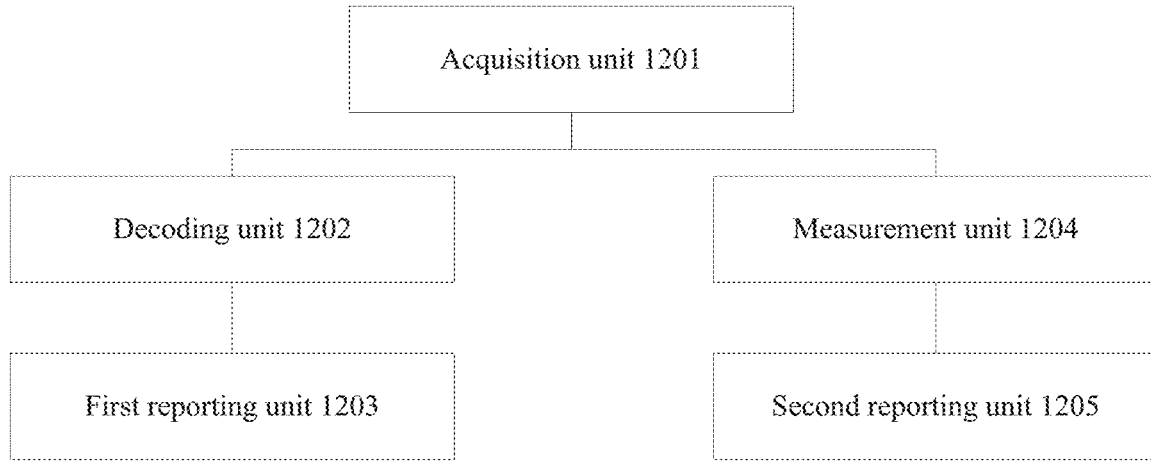
FIG. 12 is a schematic diagram 2 of structure composition of an information transmission apparatus in an embodiment of the present disclosure.

FIG. 12 is a schematic diagram 2 of structure composition of an information transmission apparatus in an embodiment of the present disclosure. The information transmission apparatus is applied to a first UE. As shown in FIG. 12, the information transmission apparatus includes an acquisition unit 1201, a decoding unit 1202, a first reporting unit 1203, a measurement unit 1204 and a second reporting unit 1205.

The acquisition unit 1201 is configured to acquire instruction information. The instruction information is used for instructing the first UE to report at least one of acknowledgement information or channel quality information through a first interface or a second interface. The first interface is an interface between the first UE and the second UE. The second interface is an interface between the first UE and the base station.

The decoding unit 1202 is configured to, if the instruction information is used for instructing the first UE to report the acknowledgement information through the first interface or the second interface, determine the acknowledgement information according to a received data decoding result.

The first reporting unit 1203 is configured to report the acknowledgement information through the first interface or the second interface.

The measurement unit 1204 is configured to, if the instruction information is used for instructing the first UE to report the channel quality information through the first interface or the second interface, measure a reference signal transmitted on a wireless channel in the first interface to obtain the channel quality information.

The second reporting unit 1205 is configured to report the channel quality information through the first interface or the second interface.

In an embodiment of the present disclosure, the acknowledgement information includes one of positive acknowledgement information or negative acknowledgement information.

If the decoding unit 1202 successfully decodes received data, the first reporting unit 1203 reports the positive acknowledgement information through the first interface or the second interface.

If the decoding unit 1202 fails to decode the received data, the first reporting unit 1203 reports the negative acknowledgement information through the first interface or the second interface.

In an embodiment of the present disclosure, the first reporting unit 1203 reporting the acknowledgement information through the first interface includes: the first reporting unit 1203 reports the acknowledgement information to the second UE through the first interface;

the first reporting unit 1203 reporting the acknowledgement information through the second interface includes: the first reporting unit 1203 reports the acknowledgement information to the base station through the second interface.

In an embodiment of the present disclosure, the second reporting unit 1205 reporting the channel quality information through the first interface includes: the second reporting unit 1205 reports the channel quality information to the second UE through the first interface;

the second reporting unit 1205 reporting the channel quality information through the second interface includes: the second reporting unit 1205 reports the channel quality information to the base station through the second interface.

In an embodiment of the present disclosure, the wireless transmission parameter includes at least one of: maximum transmit power, a number of retransmission of a data block, a number of data resource blocks, a modulation and coding scheme (MCS) range or a limiting condition for channel occupancy.

In an embodiment of the present disclosure, if the first UE receives an adjusted wireless transmission parameter, the acquisition unit 1201 receives data based on the adjusted wireless transmission parameter;

if the first UE fails to receive the adjusted wireless transmission parameter, the acquisition unit 1201 receives data based on a current wireless transmission parameter or a local pre-configured wireless transmission parameter.

In an embodiment of the present disclosure, the acquisition unit 1201 is further configured to receive measurement information sent by the base station. The measurement information includes at least one of measurement target information, measurement configuration information, measurement threshold information or measurement report information.

The measurement unit 1204 is further configured to measure the reference signal transmitted on the wireless channel in the first interface.

The second reporting unit 1205 is further configured to report the channel quality information. In an embodiment of the present disclosure, the first reporting unit 1203 is further configured to report the acknowledgement information through a physical-layer signaling or a medium access control (MAC) signaling.

The second reporting unit 1205 is further configured to report the channel quality information through a radio resource control (RRC) signaling.

In an embodiment of the present disclosure, the instruction information is sent to the first UE by the base station or the second UE, or the instruction information is pre-configured by the first UE.

Those skilled in the art should understand that the functions implemented by the units in the information transmission apparatus shown in FIG. 12 may be understood with reference to the related description of the above-mentioned information transmission method.

In practical applications, the functions implemented by the units in the information transmission apparatus may be implemented by a Central Processing Unit (CPU), a Micro Processor Unit (MPU), a Digital Signal Processor (DSP) or a Field Programmable Gate Array (FPGA) in the information transmission apparatus.

Accordingly, an embodiment of the present disclosure further provides a terminal. The terminal includes a memory and processor. Computer executable instructions are stored in the memory. When calling and executing the computer executable instructions in the memory, the processor may implement the information transmission method in the embodiment of the present disclosure. The information transmission method includes following steps: instruction information is acquired, where the instruction information is used for instructing the first UE to report at least one of acknowledgement information or channel quality information through a first interface or a second interface, the first interface is an interface between the first UE and the second UE, and the second interface is an interface between the first UE and the base station; if the instruction information is used for instructing the first UE to report the acknowledgement information through the first interface or the second interface, the first UE determines the acknowledgement information according to a received data decoding result, and reports the acknowledgement information through the first interface or the second interface; if the instruction information is used for instructing the first UE to report the channel quality information through the first interface or the second interface, the first UE measures a reference signal transmitted on a wireless channel in the first interface to obtain the channel quality information, and reports the channel quality information through the first interface or the second interface.

Figure 13:
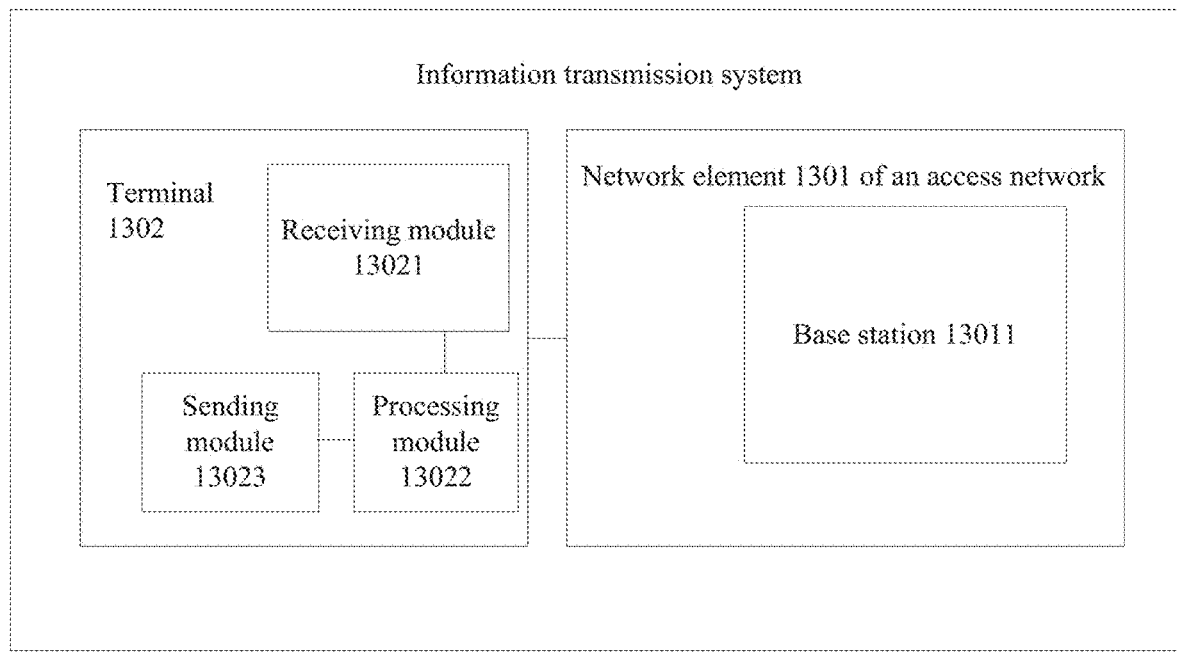
FIG. 13 is a schematic diagram of structure composition of an information transmission system in an embodiment of the present disclosure.

FIG. 13 is a schematic diagram of structure composition of an information transmission system in an embodiment of the present disclosure. As shown in FIG. 13, the information transmission system includes a network element 1301 of an access network and a terminal 1302.

The network element 1301 of the access network includes a base station 13011. The base station 13011 is configured to send instruction information and updated wireless information to the terminal 1302, and receive reporting information from other UEs.

The terminal 1302 includes a receiving module 13021, a processing module 13022 and a sending module 13023. The receiving module 13021 is configured to receive reporting instruction information sent by the base station 13011 or other terminals, or receive pre-configured reporting instruction information. The receiving module 13021 is further configured to receive an updated wireless transmission parameter. The processing module 13022 in the terminal 1302 is configured to determine acknowledgement information and measure wireless channel quality. The sending module 13023 in the terminal 1302 is configured to send the acknowledgement information and channel quality information.

According to the present disclosure, for equipment without a gesture recognition component (such as equipment without a camera), the equipment may be controlled by gestures (such as selecting functions and configuring parameters) without a user facing the equipment, and the cost of the equipment is low.

Those skilled in the art should understand that the embodiments of the present disclosure may be provided as a method, a system or a computer program product. Therefore the present disclosure may take the form of a hardware embodiment, a software embodiment, or an embodiment combining software and hardware. Furthermore, the present disclosure may take the form of a computer program product implemented on at least one computer available storage medium (including but not limited to a disk memory and an optical memory) including computer available program codes.

The present disclosure is described with reference to flowcharts and/or block diagrams of methods, equipment (systems) and computer program products according to the embodiments of the present disclosure. It should be understood that each step of the flowcharts and/or each block of the block diagrams, and combinations of steps in the flowcharts and/or blocks in the block diagrams may be implemented by computer program instructions. These computer program instructions may be provided to a processor of a general-purpose computer, special-purpose computer, embedded processor, or other programmable data processing apparatus to produce a machine, so that the instructions, which executed by the processor of the computer or other programmable data processing apparatus, create an apparatus for implementing the functions specified in at least one step in the flowcharts and/or at least one block in the block diagrams.

These computer program instructions may also be stored in a computer-readable memory that may direct a computer or other programmable data processing equipment to function in a particular manner, so that the instructions stored in the computer-readable memory produce an article of manufacture including an instruction apparatus. The instruction apparatus implements the function specified in at least one steps in the flowcharts and/or at least one block in the block diagrams.

These computer program instructions may also be loaded onto a computer or other programmable data processing equipment, to cause a series of operational steps to be performed on the computer or the other programmable equipment to produce a computer implemented process, so that the instructions that execute on the computer or other programmable equipment provide steps for implementing functions specified in at least one step in the flowcharts and/or at least one block in the block diagrams.

Accordingly, the present disclosure further provides a computer storage medium. Computer programs are stored in the computer storage medium. The computer programs are configured to execute the information transmission method in the embodiments of the present disclosure.

The above is only preferable embodiments of the present disclosure and is not used for limiting the protection scope of the present disclosure.

INDUSTRIAL APPLICABILITY

In the present disclosure, a first UE reports related information to a base station or a second UE according to instruction information sent by the base station. The base station or the second UE determines whether to retransmit and/or adjust the wireless transmission parameter according to the reported information, so that acknowledgement of the V2X data and feedback of channel quality are implemented, and the requirement of sending V2X services with high reliability is guaranteed.

What is claimed is:

1. An information transmission method, comprising:
   determining, by a second user equipment (UE), a UE needing to report information as a first UE;
   sending, by the second UE, instruction information to the first UE, wherein the instruction information is used for instructing the first UE to report at least one of acknowledgement information or channel quality information through a first interface or a second interface, the first interface is an interface between the first UE and the second UE, and the second interface is an interface between the first UE and a base station;
   wherein the acknowledgement information is reported by the first UE through a physical-layer signaling, and the channel quality information is reported by the first UE through a medium access control (MAC) signaling;
   wherein the channel quality information is obtained by the first UE measuring a reference signal transmitted on a wireless channel in the first interface;
   in response to determining that the base station or the second UE receives the acknowledgement information sent by the first UE, determining, by the second UE, whether to retransmit data through the first interface according to the acknowledgement information; and
   in response to determining that the base station or the second UE receives the channel quality information sent by the first UE, determining, by the second UE, a wireless transmission parameter of the first interface according to the channel quality information;
   wherein the wireless transmission parameter comprises a number of data resource blocks,
   wherein determining, by the second UE, the wireless transmission parameter according to the channel quality information comprises:
   comparing, by the second UE, the channel quality information with a preset threshold to obtain a comparison result; and
   determining, according to the comparison result, whether to adjust the wireless transmission parameter.

2. The information transmission method of claim 1, wherein
   in a case where the second UE is within coverage of the base station, the wireless transmission parameter of the first interface is determined according to instruction of the base station or through autonomous selection of the second UE; or
   in a case where the second UE is outside the coverage of the base station, the wireless transmission parameter of the first interface is determined according to information pre-configured by the second UE.

3. The information transmission method of claim 1, wherein the acknowledgement information comprises one of positive acknowledgement information or negative acknowledgement information, wherein the method comprises:
   in response to determining that the base station or the second UE receives the negative acknowledgement information sent by the first UE, determining to retransmit data through the first interface.

4. The information transmission method of claim 1, wherein the wireless transmission parameter further comprises at least one of:
   maximum transmit power, a number of retransmissions of a data block, a modulation and coding scheme (MCS) range or a limiting condition for channel occupancy.

5. The information transmission method of claim 1, further comprising:
   in response to determining to adjust the wireless transmission parameter, sending, by the second UE, the adjusted wireless transmission parameter to the first UE;
   wherein the adjusted wireless transmission parameter is determined by the second UE in one of following manners: instruction of the base station, autonomous selection or pre-configuration,
   wherein the method further comprises: determining, by the second UE, a UE needing to report information as the first UE; and configuring, by the second UE, measurement information for the first UE, wherein the measurement information comprises at least one of measurement target information, measurement configuration information, measurement threshold information or measurement report information.

6. A non-transitory computer storage medium, wherein computer executable instructions are stored in the computer storage medium, and the computer executable instructions are configured to execute the information transmission method of claim 1.

7. An information transmission method, comprising:
reporting, by a first user equipment (UE), at least one of acknowledgement information or channel quality information through a first interface or a second interface according to instruction information s, wherein the first interface is an interface between the first UE and a second UE, and the second interface is an interface between the first UE and a base station;
wherein the acknowledgement information is reported by the first UE through a physical-layer signaling, and the channel quality information is reported by the first UE through a medium access control (MAC) signaling;
wherein the channel quality information is obtained by the first UE measuring a reference signal transmitted on a wireless channel in the first interface;
in response to determining that the instruction information is used for instructing the first UE to report the acknowledgement information through the first interface or the second interface, determining, by the first UE, the acknowledgement information according to a received data decoding result, and reporting the acknowledgement information through the first interface or the second interface; and
in response to determining that the instruction information is used for instructing the first UE to report the channel quality information through the first interface or the second interface, measuring, by the first UE, a reference signal transmitted on a wireless channel in the first interface to obtain the channel quality information, and reporting the channel quality information through the first interface or the second interface;
wherein the first UE is a UE needing to report information determined by the second UE;
wherein the wireless transmission parameter comprises a number of data resource blocks,
wherein the method further comprising:
in response to determining that the first UE receives an adjusted wireless transmission parameter, receiving, by the first UE, data based on the adjusted wireless transmission parameter; or
in response to determining that the first UE fails to receive the adjusted wireless transmission parameter, receiving, by the first UE, data based on a current wireless transmission parameter or a local pre-configured wireless transmission parameter.

8. The information transmission method of claim 7, wherein the acknowledgement information comprises one of positive acknowledgement information or negative acknowledgement information;
in response to determining that the first UE successfully decodes received data, the positive acknowledgement information is reported by the first UE through the first interface or the second interface; or
in response to determining that the first UE fails to decode the received data, the negative acknowledgement information is reported by the first UE through the first interface or the second interface;
wherein reporting, by the first UE, the acknowledgement information through the first interface comprises: reporting, by the first UE, the acknowledgement information to the second UE through the first interface;
reporting, by the first UE, the acknowledgement information through the second interface comprises: reporting, by the first UE, the acknowledgement information to the base station through the second interface,
wherein reporting, by the first UE, the channel quality information through the first interface comprises: reporting, by the first UE, the channel quality information to the second UE through the first interface;
reporting, by the first UE, the channel quality information through the second interface comprises: reporting, by the first UE, the channel quality information to the base station through the second interface.

9. The information transmission method of claim 7, further comprising:
receiving, by the first UE, measurement information sent by the base station, wherein the measurement information comprises at least one of measurement target information, measurement configuration information, measurement threshold information or measurement report information; and
measuring, by the first UE, based on the measurement information, the reference signal transmitted on the wireless channel in the first interface, and reporting the channel quality information based on the measurement information.

10. A non-transitory computer storage medium, wherein computer executable instructions are stored in the computer storage medium, and the computer executable instructions are configured to execute the information transmission method of claim 7.

11. An information transmission apparatus, applied to a second user equipment (UE), comprising:
a processor; and
a memory for storing instructions executable by the processor,
wherein the processor is configured to execute the instructions to:
determine a UE needing to report information as a first UE;
send instruction information to the first UE, wherein the instruction information is used for instructing the first UE to report at least one of acknowledgement information or channel quality information through a first interface or a second interface, the first interface is an interface between the first UE and the second UE, and the second interface is an interface between the first UE and a base station;
wherein the acknowledgement information is reported by the first UE through a physical-layer signaling, and the channel quality information is reported by the first UE through a medium access control (MAC) signaling;
wherein the channel quality information is obtained by the first UE measuring a reference signal transmitted on a wireless channel in the first interface;
in response to determining that the acknowledgement information sent by the first UE is received, determine whether to retransmit data through the first interface according to the acknowledgement information; and
in response to determining that the channel quality information sent by the first UE is received, determine a wireless transmission parameter of the first interface according to the channel quality information;
wherein the wireless transmission parameter comprises a number of data resource blocks,
wherein the processor is configured to execute the instructions to determine the wireless transmission parameter of the first interface according to the channel quality information in the following manners:
  comparing the channel quality information with a preset threshold to obtain a comparison result; and
  determining, according to the comparison result, whether to adjust the wireless transmission parameter.

12. The information transmission apparatus of claim 11, wherein the processor is further configured to execute the instructions to: in a case where the second UE is within coverage of the base station, determine the wireless transmission parameter of the first interface according to instruction of the base station or through autonomous selection of the second UE, and in a case where the second UE is outside the coverage of the base station, determine the wireless transmission parameter of the first interface according to information pre-configured by the second UE.

13. The information transmission apparatus of claim 11, wherein the acknowledgement information comprises one of positive acknowledgement information or negative acknowledgement information; and
  the processor is further configured to execute the instructions to in response to determining that the negative acknowledgement information sent by the first UE is received, determine to retransmit data through the first interface.

14. The information transmission apparatus of claim 11, wherein the channel quality information is obtained by the first UE measuring a reference signal transmitted on a wireless channel in the first interface,
  wherein the wireless transmission parameter comprises at least one of:
  maximum transmit power, a number of retransmission of a data block, a number of data resource blocks, a modulation and coding scheme (MCS) range or a limiting condition for channel occupancy.

15. The information transmission apparatus of claim 11, wherein the processor is further configured to execute the instructions to:
  in response to determining to adjust the wireless transmission parameter, send the adjusted wireless transmission parameter to the first UE;
  wherein the adjusted wireless transmission parameter is determined by the second UE in one of following manners: instruction of the base station, autonomous selection or pre-configuration.

16. The information transmission apparatus of claim 11, wherein the processor is further configured to execute the instructions to:
  determine a UE needing to report information as the first UE; and configure measurement information for the first UE, wherein the measurement information comprises at least one of measurement target information, measurement configuration information, measurement threshold information or measurement report information.

\* \* \* \* \*

UNITED STATES PATENT AND TRADEMARK OFFICE
CERTIFICATE OF CORRECTION

PATENT NO. : 11,576,075 B2
APPLICATION NO. : 16/497413
DATED : February 7, 2023
INVENTOR(S) : Hui Xu et al.

It is certified that error appears in the above-identified patent and that said Letters Patent is hereby corrected as shown below:

In the Drawings

Sheet 2 of 7, (Reference Numeral 401) (FIG. 4), Line 4, delete "UE." and insert -- UE, --.

Sheet 2 of 7, (Reference Numeral 402) (FIG. 4), Line 4, delete "interface." and insert -- interface, --.

In the Claims

Column 23, Line 8, Claim 7, delete "information s," and insert -- information, --.

Signed and Sealed this
Twenty-seventh Day of June, 2023

Katherine Kelly Vidal
*Director of the United States Patent and Trademark Office*